United States Patent [19]
Klein

[11] 3,870,742
[45] Mar. 11, 1975

[54] ISOMERIC MIXTURE OF BICYCLIC NITRILES AND THEIR METHOD OF PREPARATION

[75] Inventor: Erich Klein, Holzminden, Germany

[73] Assignee: Dragoco Spezialfabrik konz. Riech-und Aromastoffe Gerberding & Co. GmbH, Holzminden, Germany

[22] Filed: July 5, 1972

[21] Appl. No.: 269,027

[30] Foreign Application Priority Data
  Mar. 6, 1972 Germany............................ 2210762

[52] U.S. Cl................................. 260/464, 252/522
[51] Int. Cl................... C07c 121/02, C07c 121/48
[58] Field of Search...................... 260/464; 252/522

[56] References Cited
UNITED STATES PATENTS

| | | | |
|---|---|---|---|
| 2,375,937 | 5/1945 | Miller et al, | 260/464 |
| 2,933,506 | 4/1960 | Ohloff et al | 252/522 X |
| 3,168,550 | 2/1965 | Blumenthal | 260/464 |
| 3,480,677 | 11/1969 | Meuly et al. | 252/522 X |
| 3,714,220 | 1/1973 | Dahill, Jr. | 260/464 |

Primary Examiner—Joseph P. Brust
Attorney, Agent, or Firm—Stewart and Kolasch, Ltd.

[57] ABSTRACT

A mixture of isomers of bicyclic nitriles comprising

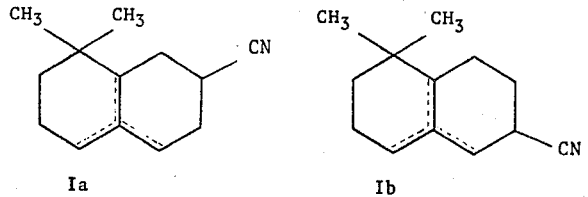

Ia     Ib their method of preparation and their use in perfume compositions.

2 Claims, No Drawings

ISOMERIC MIXTURE OF BICYCLIC NITRILES AND THEIR METHOD OF PREPARATION

BACKGROUND OF THE INVENTION

The present invention relates to isomeric mixtures of bicyclic nitriles and to their method of preparation. The present invention is also directed to the use of isomeric mixtures, particularly in conjunction with odorant compositions.

In recent years, nitriles have gained increasing importance in the perfume field. In particular, the $\alpha,\beta$-unsaturated nitriles of 3,7-dimethyl-2,6-octadienoic acid, the $\alpha,\beta$-unsaturated nitriles of 2-nonenoic acid, and the $\alpha,\beta$-unsaturated nitriles of cinnamic acid have been found to exhibit odoriferous properties. However, non-conjugated nitriles, such as for example, citronellic acid nitrile, are likewise used in the preparation of perfume compositions. In this connection, however, it appears that only those substances can be employed exclusively wherein the nitrile function is a substituent on a saturated or unsaturated molecular chain. In contrast thereto, the present invention relates to a novel bicyclic nitrile which surprisingly exudes a pleasant, tart, flowery scent reminiscent of the odor of palmarosa oil (Cymopogon martini Stapf).

SUMMARY OF THE INVENTION

An object of the present invention is to provide a new isomeric mixture of bicyclic nitriles and a method for their preparation.

Another object of the present invention is to provide new odorant compositions containing the isomeric mixture of bicyclic nitriles.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The novel nitrile is present as a mixture of isomers of Formulae Ia and Ib:

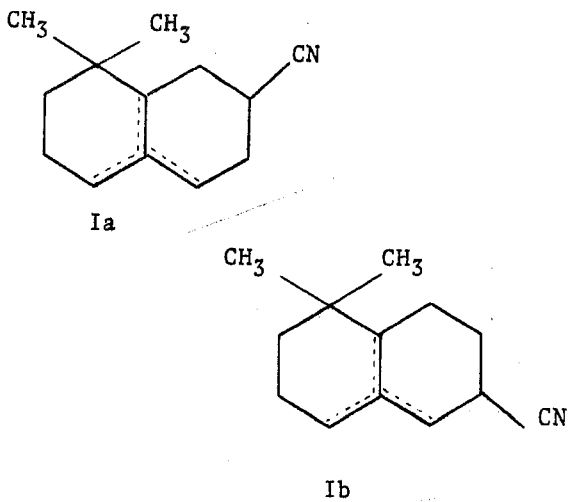

Ia

Ib

The dotted lines indicate that double-bond isomers can be present, since the single double bond present in each of these compounds can exist in any of the three positions of the compounds shown in Formulae Ia and Ib, to which the dotted lines are correlated.

The novel product of the present invention is remarkably stable with respect to air as well as light, and furthermore is stable against acids and alkalis. The isomeric mixture Ia and Ib is prepared, according to the present invention, by treating an isomeric mixture of the Formulae IIa and IIb

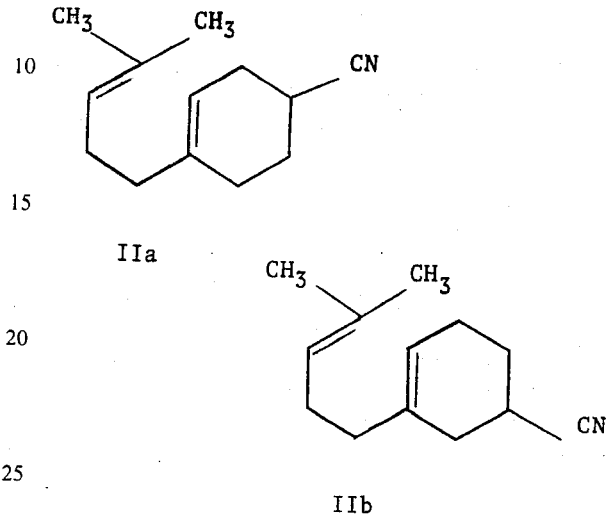

IIa

IIb with phosphoric acid. The isomeric mixture employed as the starting material can be prepared, for example, by heating an equimolar mixture of myrcene and acrylonitrile.

In accordance with a preferred embodiment of the present invention, myrcene and acrylonitrile are introduced in equivalent amounts into an autoclave, and the remaining empty space is purged with an inert gas in order to remove oxygen. The reaction mixture is then heated to a temperature of about 80°–150°C. The internal pressure, which is dependent on the size of the autoclave, rises, for example, to about 2–4 atmospheres during this step. In order to attain as optimum a conversion as possible, a reaction time of about 5–10 hours is necessary, this time period being dependent upon the reaction temperature. After termination of the reaction, the reaction product, which is a mixture of the two isomers of Formulae IIa and IIb above, is separated from the unreacted starting material by distillation under a vacuum of about 10–20 mm. Hg. The thus-obtained mixture of isomers is then dissolved in approximately the same quantity of solvent, e.g. benzene, toluene, petroleum ether, and the like, and then, according to the present invention, is agitated at temperatures of between about 50° and 60° C. for about 4–6 hours, with the addition of about twice the amount by weight of 85% strength phosphoric acid, based on the amount by weight of the isomeric mixture employed (this corresponds to a molar ratio of about 1:4). Here again, the reaction time is essentially dependent upon the reaction temperature. At a higher reaction temperature the reaction velocity increases, and thus the reaction time is reduced. After the reaction has terminated, the reaction mixture is poured into water, and the thus-obtained mixture is extracted with benzene. The benzene extract is then washed until neutral with a sodium carbonate solution. After removing the solvent by distillation, the product is purified by fractional distillation.

The unusual and pleasant scent of the reaction product, which product can be readily obtained according to the present invention, is of great interest for the perfume art. Thus, the product can be utilized in a great variety of perfumery compositions without the need for separation into the individual isomers, which fact is very advantageous in practice. Suitable concentrations of the isomeric mixture of the present invention can be determined in the usual manner by the perfumer to achieve a desired result. Normally, the isomeric mixture of the present invention can be used in perfume compositions in a range of between about 5% and 40%. A typical example of such a composition containing a fanciful scent is set forth in Example 2 hereinbelow.

The present invention is also related to an odorant composition, containing a mixture of isomers of Formulae Ia and Ib nated, the mixture is further agitated for 5 hours at a temperature of between about 50° and 60° C. Then, after the reaction mixture has been cooled, it is poured into 5000 μg of water, extracted with benzene, and the benzene extract is washed neutral with a sodium carbonate solution and the benzene is distilled off. The residue yields, after fractional distillation on a Vigreux column, 1483 g. of the nitrile mixture of the present invention (78% of the theoretical value) as a relatively viscous, slightly yellow-colored liquid having the following physical properties: Boiling point: 125° C. (1mm. Hg); $n_D^{20}$: 1.5030; $d_4^{20°}$: 0.9741.

Example 2 shows a typical perfume composition

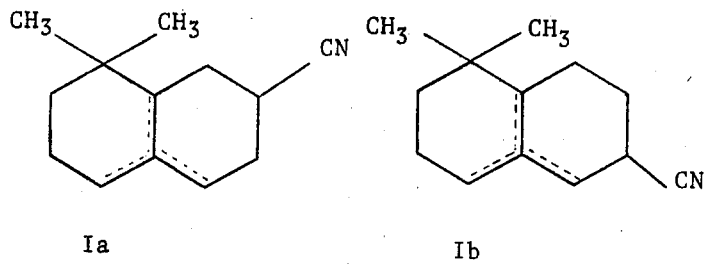

Ia                                   Ib

PREFERRED EMBODIMENTS OF THE INVENTION

The following examples are given merely as illustrative of the present invention and are not to be considered as limiting.

EXAMPLE 1

A mixture of 1360 g. of myrcene (10 moles) and 530 g. of acrylonitrile (10 moles) are heated together with 2 g. of hydroquinone as the radical-trapping (radical-neutralizing) agent in an autoclave under agitation at 150° C. for 8 hours. After cooling the mixture and discharging it from the autoclave, any unreacted starting material is distilled off from the reaction mixture by a water-jet aspirator at about 10–20 mm. Hg. The residue is then distilled in a fractionating column having a length of 50 cm. and packed with glass particles. The thus-obtained distillate of 1500 g. is dissolved in 1500 g. of benzene, and this solution is allowed to flow slowly, at room temperature, into 3000 g. of 85% strength phosphoric acid. During this step, the temperature of the reaction mixture rises to 50° C. without the supply of external heat. After the addition step is terminated, using the isomeric bicyclic nitriles of the present invention.

EXAMPLE 2

| Components | Parts |
| --- | --- |
| Lavender oil | 160 |
| Linalool | 150 |
| Hydroxycitronellal | 80 |
| Isocamphylcyclohexanol | 80 |
| Benzyl acetate | 80 |
| Palmarosa oil | 70 |
| Phenylethyl alcohol | 40 |
| Coumarin | 30 |
| Heliotropin | 20 |
| Oakmoss extract (50% strength in dimethyl phthalate) | 20 |
| Geranium oil bourbon | 10 |
| Vetiver oil bourbon | 10 |
| Nitrile mixture of Ia and Ib | 250 |
| | 1,000 |

The invention being thus described, it will be obvious that the same may be varied in many ways. Such variations are not to be regarded as a departure from the spirit and scope of the invention and all such modifications are intended to be included within the scope of the following claims.

I claim:

1. A mixture of isomers of bicyclic nitriles comprising,

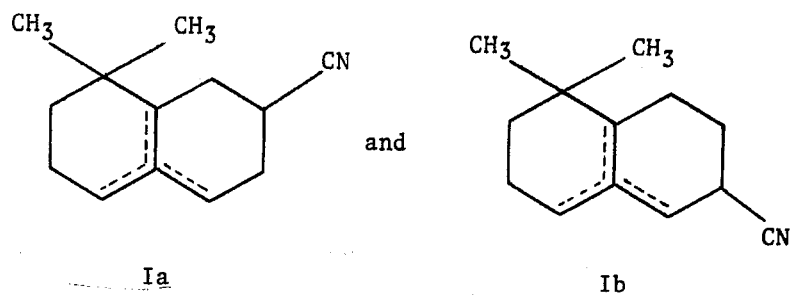

Ia                and                Ib the single double bond present in Ia and Ib being located in any of the three positions indicated by the dotted line, said mixture of isomers being prepared by the cyclization of the isomers obtained by the reaction of equivalent amounts of myrcene and acrylonitrile.

2. A process for the preparation of a mixture of bicyclic nitrile isomers of the formulae:

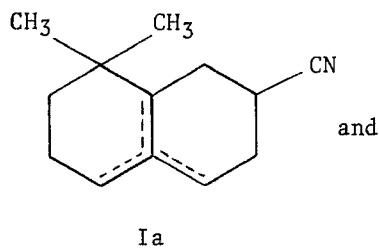

Ia and Ib the single double bond present in Ia and Ib being located in any of the three positions indicated by the dotted iines, which comprises reacting equivalent amounts of myrcene and acrylonitrile in an oxygen-free autoclave at a temperature of about 80° to 150°C. for about 5 to 10 hours to give a mixture of isomers of the formulae:

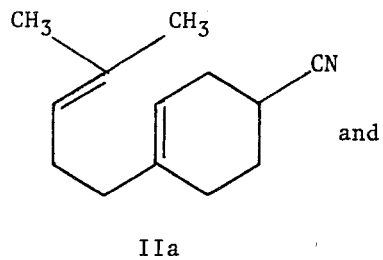 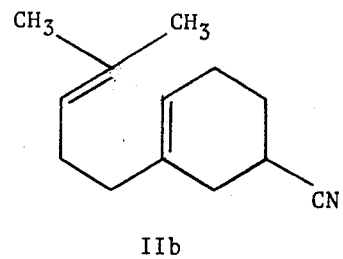

IIa and IIb cyclizing the mixture of isomers of Formulae IIa and IIb with 85% strength phosphoric acid, the phosphoric acid being used in an amount by weight of about two times the amount of the mixture of isomers of Formulae IIa and IIb, at a temperature of about 50° to 60°C. for a period of time of about 4 to 6 hours, and recovering the mixture of isomers of Formulae Ia and Ib from the reaction mixture.

* * * * *